July 22, 1969          R. G. MILLER          3,457,138
TRANSPARENT COPPER COATED GLASS ARTICLES AND IMPROVED
ELECTROLESS METHOD FOR PRODUCING SAID ARTICLES
Filed May 5, 1967

INVENTOR.
RICHARD G. MILLER
BY
Oscar L. Spencer
ATTORNEY 3,457,138
TRANSPARENT COPPER COATED GLASS ARTICLES AND IMPROVED ELECTROLESS METHOD FOR PRODUCING SAID ARTICLES
Richard G. Miller, Pittsburgh, Pa., assignor to PPG Industries, Inc., Pittsburgh, Pa., a corporation of Pennsylvania
Continuation-in-part of application Ser. No. 285,356, June 4, 1963. This application May 5, 1967, Ser. No. 636,464
Int. Cl. B32b *17/06, 15/20*
U.S. Cl. 161—196          16 Claims

ABSTRACT OF THE DISCLOSURE

This invention is directed to an improved non-electrolytic, non-galvanic chemical method of forming copper films on glass, and to transparent glass articles produced thereby. More specifically, this invention is directed to forming transparent copper films on glass by three essential steps involving: (1) contacting glass with a dilute aqueous solution of a stannous salt, (2) thereafter contacting said glass with an aqueous silver salt solution containing a silver salt and a reducing agent to deposit a thin, transparent silver film on the glass, and (3) then contacting the thus silvered glass with an aqueous alkaline copper salt solution containing a copper salt, a reducing agent, and a tartrate salt in the presence of a salt of a metal selected from the group consisting of nickel and cobalt. The invention further pertains to transparent viewing closures containing a transparent copper coated glass sheet which reflects a large percentage of the solar radiation impinging thereon.

CROSS REFERENCES TO RELATED APPLICATIONS

This application is a continuation-in-part of applicant's copending application Ser. No. 285,356 filed June 4, 1963 for "Method and Articles," now abandoned.

DISCLOSURE

Prior attempts to produce copper films on previously silvered glass were largely devoted to galvanic, electrolytic, or non-electrolytic, non-galvanic chemical methods with the latter involving chemical deposition of copper films using filming solutions containing copper salts and various reducing agents. All of these methods produced generally unsatisfactory results.

The galvanic deposition methods are costly to conduct, and great difficulty is experienced in forming smooth copper film having the requisite uniformity of thickness. Moreover, the expense of a galvanic deposition is increased to the requirement of depositing a silver film having a thickness of at least 50 milligrams per square foot of glass surface.

The prior art electrolytic procedures are expensive due to the requisite apparatus needed to maintain an electric current in the copper plating bath. Furthermore, it is difficult to achieve smooth copper films having uniform texture and thickness by the electrolytic procedures.

The prior chemical salt deposition methods are not only more time consuming than the galvanic and electrolytic methods, but also are quite expensive in that usually a noble metal salt below silver in the electromotive series is considered necessary to prepare the glass surface for deposition of the copper. Moreover, these prior chemical deposition methods, employing noble metal salts other than silver, for example, salts of gold, platinum and palladium, also evidence considerably less adhesion of the copper film than is attainable according to this invention.

Another disadvantage of prior art chemical deposition methods resides in the length of time required to deposit a copper film of the requisite thickness. In this regard a period of 30 minutes to one hour is usually required when forming copper mirrors by such methods.

In sharp contrast to these three prior art methods, the present invention has the advantages of producing copper films on glass at low cost in a reasonably rapid period of time, e.g., period of time ranging from about 1 to 15 minutes or so, and the copper films thus deposited possess excellent adhesion to the glass base upon which they are formed.

These and other advantages attendant to the use of the present invention will be more fully understood from the description which follows.

Prior to conducting the copper filming procedure in accordance with this invention, the glass surface to be filmed is first cleaned by the usual cleaning procedures and using the conventional cleansing agent employed for cleaning glass prior to depositing mirror films thereon.

Then the cleaned glass is contacted with a dilute solution of a stannous salt for a short period of time at ambient room temperatures, viz 65 to 95° F., after which the glass is rinsed with water, preferably distilled water or de-ionized water, viz, demineralized water. A variety of salts can be employed in this first step of the process, e.g., stannous chloride, stannous bromide, stannous iodide, stannous sulfate, etc., but stannous chloride is the stannous salt of choice.

Usually the weight concentration of the stannous salt in the aqueous stannous salt solution ranges from about 0.02 to 50.0 percent. Preferably, however, a very dilute stannous salt solution is used, such one containing from about 0.05 to 0.2 percent by weight stannous salt, e.g., stannous chloride. No real advantages are achieved by exceeding 0.20 percent by weight stannous salt.

After the aqueous rinse following the stannous salt treatment while the glass surface to be filmed is still wet from the rinse, the glass is contacted with an aqueous ammoniacal silvering solution by mixing two solutions prior to or at the time of contact, one solution containing an ammoniacal silver salt and the other containing a reducing agent in order to deposit an extremely thin film of metallic silver onto the glass. This extremely thin silver film, which can be referred to a "flash" silver film, usually ranges in thickness from about 4.0 to 20.0 x $10^{-8}$ inches, and is most advantageously applied at ambient room temperatures by spraying the aqueous silver salt solution and the silver reducing solution onto the previously tin salt treated glass surface. In a spraying procedure the silver salt solution and reducing solution can be mixed in the spray gun and issue as a single solution, or separate spray guns can be used. In the latter case the silver salt solution is generally applied first followed by spraying with reducing solution. However, other methods of contacting the silvering solution with the glass can be used, such as pouring, immersing, roll coating, brushing, screening, etc.

Any convenient water-soluble or readily water dispersible silver salt can be used in forming the silvering solution. However, it is generally preferable to employ an aqueous solution containing silver sulfate, silver nitrate, or silver chloride, with silver nitrate being the water-soluble silver salt of choice.

The aqueous ammoniacal silvering solution can be prepared by bubbling ammonia through an aqueous solution of silver salt after dissolving the silver salt in water. Tap water can be used to prepare the aqueous ammoniacal silver salt solution. However, it is generally preferable to used demineralized or distilled water in place of tap water.

In place of bubbling ammonia gas into the silver salt solution the ammoniacal silver salt solution can be prepared by dissolving an ammoniacal complex silver salt, such as ammoniacal silver nitrate, in distilled or demineralized water.

Preferably, however, the ammoniacal silver nitrate aqueous solution is prepared by dissolving silver nitrate in demineralized water, and then adding an aqueous solution of ammonium hydroxide thereto.

The aqueous silvering solution as it contacts the glass surface can contain from about 0.0001 to 10.0 percent by weight of the selected ammoniacal complex silver salt, e.g., ammoniacal silver nitrate. Usually the weight concentration of the silver salt ranges from 0.001 to 1.0 percent with a weight concentration of from 0.01 to 0.1 percent being preferred.

The aqueous silvering solution also contains a reducing agent, such as formaldehyde, dextrose, invert sugar (50 weight percent dextrose and 50 weight percent levulose, etc., to enable reduction of the silver salt film to metallic silver). The silver reducing agent can be employed in amounts of 0.001 to 25 percent by weight. Usually the weight concentration of reducing agent ranges from 0.005 to 5.0 weight percent, and more preferably from 0.008 to 1.0 weight percent.

Following the deposition of the metallic silver film, the glass article while still wet from the thin silvering solution is filmed with copper by contacting it with an aqueous, alkaline copper filming solution containing a readily water-soluble or water-dispersible copper salt, a reducing agent, a tartrate salt, a pH control agent, and a salt of a metal selected from the group consisting of nickel and cobalt.

The copper filming solution is prepared by dissolving the copper salt, for example, copper sulfate in water followed by dissolving the water-soluble nickel or cobalt salt, such as nickel sulfate or cobalt sulfate, into the aqueous copper solution using vigorous stirring where necessary to accomplish dissolution. Then a commercial aqueous formaldehyde solution, for example, an aqueous solution containing 37 percent by weight formaldehyde, is added to the copper solution. Separately, another solution is prepared containing a reducing tartrate salt, such as sodium-potassium tartrate; a pH control agent which will insure a basic pH of the copper filming solution, e.g., sodium hydroxide; and water. Then the alkaline tartrate aqueous solution and the copper salt solution are mixed shortly before usage, usually in equal parts by volume of each solution, followed by diluting with water. When the solutions are prepared a fairly long period, e.g., more than two hours before actual usage, it is preferable to keep the formaldehyde and tartrate salt separated, since the reduction of the copper filming salt occurs more rapidly when both the formaldehyde and tartrate are present with the copper salt than when the formaldehyde and copper salt are present in one solution and separate from the tartrate salt. It should be realized that instead of preparing separate copper salt solutions and alkaline tratrate solutions and then mixing these separate solutions, all ingredients can be added together to form a single solution thus avoiding the later mixing step. These solutions are usually prepared and applied at ambient room temperatures, viz, from about 65 to 95° F. Also the copper salt-formaldehyde-nickel or cobalt salt solution can be applied to the silvered glass surface first followed by application of the tartrate-caustic soda solution.

In any event the previously silvered glass article while still wet from the silvering step is contacted with the copper filming solution containing the nickel or cobalt salt, for example, by flowing the copper film forming solution onto the silvered glass surface in one or two stages as mentioned above. However, instead of contacting the copper filming solution with the silvered glass surface by flowing, other means of contacting can be used, e.g., spraying from one or more spray guns, roll coating, dipping, brushing, screening, etc. Any convenient contacting or coating system which insures adequate contact of the copper film forming solution with the silvered glass surface can be employed.

This copper film can be deposited using the above mentioned solution containing the nickel or cobalt salt to yield transparent copper films having excellent adhesion to the silvered glass base in a period of from 0.5 to 5 minutes.

Transparent glass articles having transparent heat reducing metallic copper films thereon can be produced having a luminous transmittance as high as 50 percent in accordance with this invention. These copper filmed glass articles are useful as solar energy reflectors. In this capacity they perform a doubly advantageous role when employed as viewing closures in factories, dwellings, etc., since they reflect solar heat rays, viz, infrared radiations ranging from about 0.3 to 2.1 microns, yet act as poor radiators of room temperature heat radiations. This helps to reduce air conditioning costs in the summer time and retain heat in the winter time.

Some of the ways in which the articles of this invention can be employed as transparent viewing closures will be discussed herein in terms of the figures of the drawings, like reference numerals referring to like parts in which.

Figure 1:
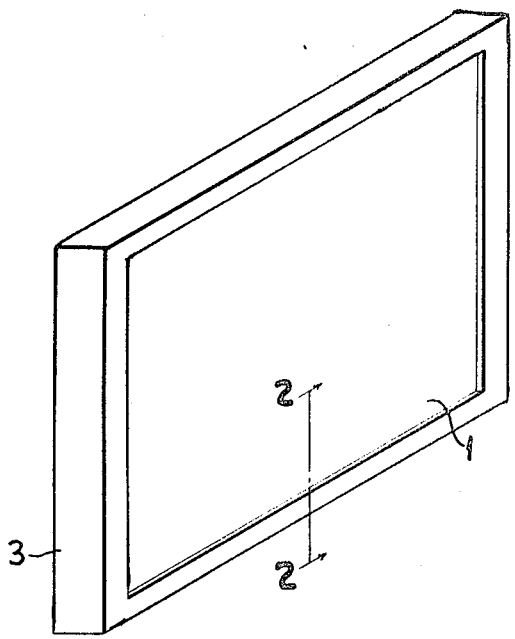
FIGURE 1 is a perspective view of an insulating glass unit.

Referring more specifically to FIGURES 1–4, there are shown various types of glass insulating structures having transparent glass sheets or plates 1 and 2 mounted in a common frame 3 and having an air space 4 located between the glass sheets. In accordance with conventional practice a sealant material 5, e.g., as disclosed in U.S. Patent 3,076,777, is employed about the outer edge periphery of sheets 1 and 2 and between the sheets and the frame to prevent ingress of moisture, dirt, etc., into the insulating unit. Spacer elements 7 retain the proper amount of spacing between the sheets. The transparent, heat reflecting copper filmed surface is shown at 6 located interiorly on the air space side of the insulating structures in the various articles shown in FIGURES 2–4.

Figure 2:
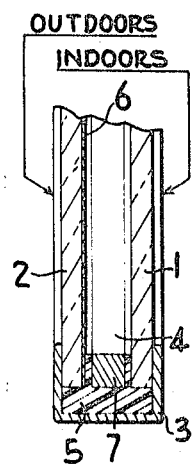
FIGURE 2 is a sectional view of the insulating glass unit of FIGURE 1 taken along the line I—I thereof.

FIGURE 2 shows the preferred placement of the transparent metallic copper films of this invention in an insulating glass viewing closure when the copper film is primarily employed to reduce solar heat gain in summer and radiated room heat loss in winter in a non-electrically heated insulation unit. Although slightly less effective, the transparent copper film 6 could be deposited on the air space surface of indoor glass sheet or plate 1.

Figure 3:
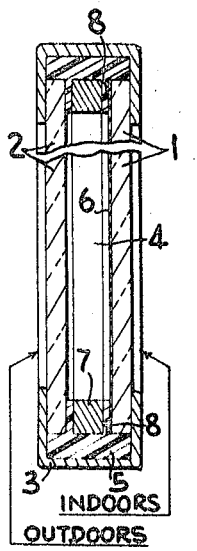
FIGURE 3 is a vertical sectional view of an electrically heated glass insulating unit of similar type to that shown in FIGURE 1.

FIGURE 3 shows the preferred placement of the transparent copper film 6 on the air space surface of indoor glass sheet or plate 1 where the insulating unit is electrically heated through the copper film 6 via bus bars 8 in intimate electrical contact therewith. The bus bars are connected to a source of current in conventional manner (not shown). The placement of the film 6 on the air space side of indoor glass sheet 1 allows more effective heating of air space 4 and provides more efficient insulation in winter.

Figure 4:
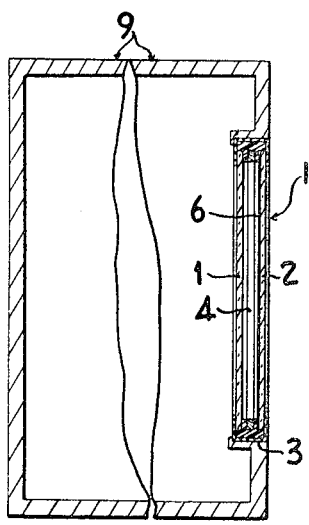
FIGURE 4 is a vertical sectional view of a transparent oven door.

FIGURE 4 shows the preferred location of transparent heat reflective copper filmed surface 6 in a transparent oven door 10 of oven 9. Filmed surface 6 is positioned on the air surface of outer glass sheet 2 thus allowing the copper film to reflect a good portion of the radiated oven heat back into the oven to conserve thermal energy while at the same time keeping the copper film positioned away from the heat source to avoid thermal degradation thereof. Moreover, this positional arrangement makes the outer (kitchen facing) surface of filmed sheet 2 sufficiently cool to the touch to avoid burning the hands of the oven user.

Figure 5:
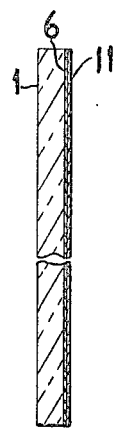
FIGURE 5 is a vertical sectional view of a monolithic transparent copper filmed glass article.

FIGURE 5 shows utilization of the present invention to produce monolithic transparent viewing closures. Glass sheet or plate 1, which can be of clear glass or tinted heat absorbing glass is provided with a transparent copper protective film 11 of plastic or other material, e.g., filmed surface 6. The filmed surface is provided with a protective film 11 of plastic or other material, e.g., quartz; alumina; magnesium fluoride; tin oxide, cobalt oxide, iron oxide, nickel oxide and mixtures of these oxides; etc., deposited in any suitable fashion, to increase the durability and/or scratch resistance of the copper filmed surface 6. The index of refraction of protective film 11 closely matches that of glass sheet 1.

Figure 6:
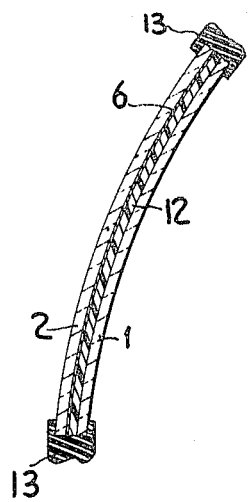
FIGURE 6 is a sectional view of a laminated safety-glass automobile backlight.

FIGURE 6 shows utilization of the present invention to form heat reflective automobile backlights, sidelights and other safety-glass type structures. Glass sheets 1 and 2 are adhered together using any suitable thermoplastic interlayer 12, e.g., polyvinyl butyral. Filmed surface 6 contacts the interlayer and can be located either on outer glass sheet 2 or inner sheet 1. Customarily a resilient mounting channel member 13 is provided for attaching the backlight to the automobile frame.

Figure 7:
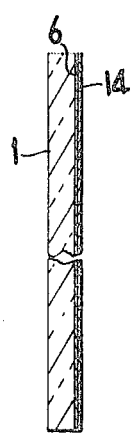
FIGURE 7 is a vertical sectional view of an opaque copper mirror having a protective coating of opaque paint thereon.

FIGURE 7 illustrates a mirror having opaque copper film 6 deposited on transparent glass plate 1 with opaque paint film 14 applied to the opaque copper film.

In the above description of the drawings, repeated reference was directed to copper film 6. It should be understood that in all such cases the glass surface was first treated with stannous salt and silvered prior to deposition of the copper film.

If instead of forming transparent copper films, it is desired to form opaque copper mirrors on glass as in the copper mirror shown in FIGURE 1, the deposition of the added thickness of copper film can be conducted in several ways. One procedure involves building up the addition copper film thickness by repeated contacts of the copper filming solution with the transparent copper filmed glass until the desired opaque thickness is attained.

In this regard copper films having a thickness, in terms of copper concentration ranging from about 1 to about 60 milligrams or less of copper per square foot are generally regarded as transparent whereas copper films ranging from about 90 to 400 milligrams or more of copper per square foot are generally considered opaque, with intermediate thickness being regarded as translucent to opaque depending on the use of the article available light in the environment of use at given times, etc.

Opaque copper films can thus be developed using repeated contacts over time period ranging from about 5 to 15 minutes depending upon the concentration of copper salt in the copper filming solution, filming temperature, and the time period of each contact. Hence, a transparent copper film can be developed in five minutes, using a very dilute concentration of copper salt over a long contact period whereas an opaque copper film can be developed in five minutes using high concentrations of copper salt repeated rapidly over shorter contact periods. Usually, however, it is most desirable to form transparent copper films as rapidly as possible as time is thereby conserved allowing more transparent filmed articles to be produced in a given time period with a given amount of equipment. In this respect copper filming periods of from 30 seconds to three minutes yield excellent transparent copper solar heat reflective films.

Another procedure for increasing the thickness of the transparent copper films to opaque copper mirrors involves dipping the surface to be filmed in a well circulated bath of copper filming solution and maintaining contact for periods of from 5 to 15 minutes. The surfaces which are not be filmed are masked.

Other methods of preparing opaque copper mirror films involve first forming thin, transparent metallic copper films using the copper film forming solutions containing a nickel or cobalt salt followed by depositing additional thicknesses of copper using electrolytic or galvanic deposition procedures to build up the desired opaque films. For example, by combining the galvanic method with the method of this invention in the above mentioned manner, opaque copper mirrors can be produced in very short time periods. Once the initial thin copper film has been deposited onto the thinly silvered glass surface by the use of copper film forming solution containing a nickel or cobalt salt in accordance with this invention, then galvanic deposition can be used to increase the thickness of the copper film without loss in adhesion of the metallic copper film. However, this is not true if the entire thickness of the copper film is deposited wholly by galvanic methods because such films have considerably less adhesion to the presilvered glass base and tend to be non-uniform in thickness and texture.

Therefore it can be seen that in order to gain the advantages of the tenacious adherence and uniformity in thickness and texture (homogeneity) for the copper films attainable in accordance with this invention, the initial deposition of the copper film must be accomplished chemically by the use of the copper filming solution containing a nickel or cobalt salt.

Comparative trial tests have been conducted in which the nickel or cobalt salt has been eliminated from the copper filming solution mentioned above. When the nickel or cobalt salt is omitted from the copper filming solution, it is extremely difficult to deposit the metallic copper film onto the previously silvered glass surface. Instead of forming a tenaciously adherent, uniformly deposited copper film, the copper film appears to exfoliate (peel) simultaneously with its formation due to the formation of blisters or bubbling between the silvered glass surface and the newly formed copper film surface. This blistering causes the copper film to be removed from the silvered glass surface as it is formed, thereby resulting in extremely non-uniform copper films and mirrors on the presilvered glass base. The areas of the silvered glass surface containing the blisters have little or no copper film thereon. This heterogeneity and poor adhesion of the copper films in many instances leads to rejection of the copper filmed articles.

The cause of this blistering or bubble formation when a nickel or cobalt is omitted, is not completely understood. However, theoretically speaking, it may be due to the evolution of gas at the silver-copper film interface at the time the metallic copper film is formed during the reduction of the copper salt to metallic copper.

Regardless of the cause of blistering, it is concluded that a nickel or cobalt salt must be present in order to eliminate this highly unsatisfactory condition. The behavior of the nickel or cobalt salt in substantially eliminating this blistering or bubbling effect could perhaps be due to the nickel or cobalt salt having a catalytic inhibitive or controlling effect upon the formation of such a gas or gasses during the reduction of the copper salt to the metallic copper film. It should be understood, however, that this invention is not necessarily dependent for its operation upon this or any theory as to the theoretical explanation for the successful operation thereof.

Therefore, for the purposes of forming copper films, non-electrolytically in accordance with this invention, the use of a nickel or cobalt salt is considered to be critical.

The formation of the copper films using the above noted nickel or cobalt containing salt is usually conducted at alkaline pH. Usually the pH of the aqueous copper salt film forming solution ranges from about 8 to 12, and more preferably ranges from about 9 to 11, with a pH of 10.5 to 11.5 yielding excellent results. The use of copper film forming solutions having acidic pH should be avoided since under acid pH conditions the copper film formation does not proceed satisfactorily.

While the above discussion relating to the copper salt used in the copper film forming solution has referred specifically to copper sulfate, it should be noted here that other water-soluble or readily water-dispersible copper salts can be used. In this regard the following copper salts can be cited as exemplary for use in accordance with this invention: copper nitrate, copper chloride, copper phosphate, copper bromide, copper iodide, copper acetate, copper formate, copper tartrate, etc.

The contact of the above described copper film forming solution with the previously silvered glass can be effected conveniently using the copper film forming solution at ambient room temperatures, viz temperatures ranging from about 65 to 95° F. In such cases the glass article is usually maintained at ambient room temperatures also.

However, surprisingly it has been determined that heating the copper film forming solution prior to contact with the presilvered glass base significantly accelerates the copper film deposition rates without objectionable effects on the copper film itself. Use of these elevated temperatures is not accompanied by blistering. In this regard it should be noted that the temperature of the copper filming solution is more significant in increasing the rate of formation of the copper film than either contact time or copper ion concentration in the filming solution. For example it has been discovered that when a nickel or cobalt salt is present increasing the temperature of the copper salt solution from 80° F. to 100° F. more than doubles the rate at which copper films are deposited onto the glass while still avoiding exfoliation of the copper films. Hence, slight temperature increases are capable of effecting substantial increases in copper film deposition rate during the copper filming operation.

When preheating the copper filming solutions to temperatures above ambient room temperature, e.g., temperatures ranging from about 96° F. to 150° F. or higher, it is not necessary to preheat the glass surface in order to attain these substantial increases in copper film deposition rate. However, the glass article can likewise be preheated, and this presents no procedural problems in carrying out the copper filming step as long as the glass is not heated to such a temperature as to dry the filming surface prematurely, viz, before contact with the copper filming solution. Similarly the aqueous copper salt filming solution can be heated during contact with the glass, e.g., in cases where the presilvered glass is partially immersed or dipped into a heated bath of the aqueous copper film forming solution.

By heating the aqueous copper film forming solution to temperatures ranging from about 100° to 120° F. or higher, very pleasing thin transparent copper films can be produced within a time period of less than about 5 minutes for example time periods ranging from 1 to 3 minutes. Opaque copper films (mirror films) usually require from 4 minutes to 10 minutes total contact with the copper filming solutions. When these copper film deposition periods are compared with the much longer periods required by prior art non-electrolytic, non-galvanic chemical copper deposition procedures, e.g., 30 minutes to one hour and even longer, the rapidity and ease of deposition afforded by the practice of this invention is readily apparent.

After the copper filming has been accomplished, the copper filmed glass surface is usually rinsed with distilled or de-ionized water to remove excess copper filming solution therefrom.

The present invention is applicable especially in forming transparent and opaque metallic copper films on glasses, especially soda-lime-silica glasses, but can be used to copper film a wide variety of glass, ceramic, siliceous and calcareous base compositions. For example, this invention can be used to provide metallic copper films on the following types of glasses: soda-lime-silica glasses; alkali-alumina-silica glasses, such as those containing lithia as a component alkali; alkali zirconia-silica glasses, alkali-alumina-zirconia-silica glasses; borosilicate glasses; etc. Bearing this in mind, the present invention is described hereinbelow with specific reference to soda-lime-silica glass.

The soda-lime-silica glass to be treated can be a clear glass or it can be a colored glass tinted by the introduction of various conventional glass colorants such as metal oxides or metal oxide mixtures into the glass forming batch. These latter glasses are often referred to as heat absorbing glasses especially when they contain iron oxide. Representative soda-lime-silica glass bases which can be treated in accordance with this invention usually contain 65 to 75 percent by weight $SiO_2$, 10 to 18 percent by weight $Na_2O$, 5 to 15 percent by weight CaO, 1 to 5 percent by weight MgO, 0 to 1.0 percent by weight $Na_2SO_4$, 0 to 5 percent by weight aluminum oxide ($Al_2O_3$), 0 to 8 percent by weight $K_2O$, 0 to 8 percent by weight $B_2O_3$, 0 to 1 percent by weight iron oxide ($Fe_2O_3$), and 0 to 0.7 percent by weight of NaCl, $SO_3$, $As_2O_5$, BaO, NiO, CoO and Se and combinations thereof.

A representative range of composition for soda-lime-silica glasses is listed as follows (wherein the given amounts of metals listed are determined as their oxides, except as otherwise noted):

| Component: | Percent by weight |
|---|---|
| $SiO_2$ | 68–73.5 |
| $Na_2O$ | 12–17 |
| CaO | 7–12 |
| MgO | 2–4 |
| $Na_2SO_4$ | 0–0.8 |
| NaCl | 0–0.3 |
| $Fe_2O_3$ | 0.05–0.09 |
| $Al_2O_3$ | 0–3.5 |
| $B_2O_3$ | 0–6 |
| $K_2O$ | 0–1.5 |
| $As_2O_5$ | 0–0.5 |
| BaO | 0–0.7 |
| NiO | 0–0.1 |
| CoO | 0–0.1 |
| $SO_3$ | 0–0.5 |
| Se | 0–0.1 |

This invention will be further understood from the specific examples which follow. It should be noted, however, that the present invention is not necessarily limited to the specific materials, temperatures, contact times, and pH values noted in the below examples.

Example I

| Component: | Percent by weight |
|---|---|
| $SiO_2$ | 73.0 |
| $Na_2O$ | 13.2 |
| CaO | 8.5 |
| MgO | 3.5 |
| $Al_2O_3$ | 1.2 |
| $Na_2SO_4$ | 0.4 |
| NaCl | 0.1 |
| $Fe_2O_3$ | 0.1 |

Twelve inch by twelve inch by one-eighth inch clear glass sheets of the composition listed above are cleaned using the conventional cleaning procedures used to prepare glass surfaces for mirroring, and are then rinsed with demineralized water.

Then the glass surface to be filmed with copper is coated with a stannous chloride aqueous solution containing 0.1 percent by weight stannous chloride salt by pouring it onto the glass surface. The stannous chloride salt is prepared by dissolving 1 weight part of stannous chloride in 1,000 weight parts of demineralized water at room temperature to form the stannous salt solution. The stannous salt solution is allowed to contact the glass surface to be filmed for a period of 1 to 3 minutes, followed by rinsing the stannous salt treated glass surface with demineralized water for 0.5 to 1 minute rinse period.

Then the thus stannous salt treated glass surface is immediately contacted while still wet from the demineralized water rinse with an aqueous solution of ammoniacal silver nitrate containing 0.25 percent by weight silver nitrate. This ammoniacal silver nitrate aqueous solution is prepared prior to use by dissolving 5 weight parts silver nitrate in 100 weight parts of demineralized water followed by the addition of 15 volume parts of aqueous ammonium hydroxide. Then sufficient water is added to bring to a volume of 1,000 volume parts. Then 10 weight parts of dextrose sugar is dissolved in 1,000 weight parts of demineralized water to form a reducing solution. The silver film is applied by intermingling the two solutions in equal parts and spraying the intermingled volume solutions onto the previously prepared glass surfaces. The previously rinsed stannous salt treated glass surface is contacted at 80° F. with the above aqueous silvering solution for a period of 0.5 to 5 minutes by spraying the silvering solution onto the stannous salt treated glass surface, to deposit transparent metallic silver films having thicknesses ranging from 4 to 20 x $10^{-8}$ inch. Then the excess silver solution is rinsed with demineralized water.

Next while the glass surfaces are still wet with the silvering solution, the thus silvered glass surfaces are immediately subjected to contact with a copper salt film forming solution previously prepared by mixing (A) a copper solution containing 34.6 weight parts cupric sulfate, 8.6 weight parts nickel sulfate, 275 volume parts of a 37 percent by weight aqueous formaldehyde solution (previously prepared by addition of the formaldehyde to demineralized water) and 1,000 volume parts of de-ionized water with (B) an aqueous alkaline tartrate salt solution containing 175 weight parts of sodium-potassium tartrate, 50 parts by weight of sodium hydroxide, and sufficient demineralized water to arrive at a total volume of 1,000 volume parts. Upon mixing of the copper solution "A" and the alkaline tartrate solution "B," the resulting solution is then diluted by mixing with 4 volume parts of de-ionized water. This solution is then flowed onto the previously silvered glass surfaces by pouring repeatedly and allowed to contact it for periods ranging from 2 to 3 minutes to form thin, transparent metallic copper film having an average thickness of 0.75 x $10^{-6}$ inches (30 to 35 milligrams of copper per square foot of glass surface) uniform in texture and homogeneous in color indicating good uniformity in the deposition of the copper films. Thereafter, the thus formed copper filmed surfaces are rinsed with demineralized water to remove excess copper film forming solution. The copper film surface is then dried in the air.

The thus formed transparent copper filmed glass articles possess a luminous transmittance ranging from 25 to 40 percent, and show a solar energy reflection of 50 to 60 percent (coated side) as compared to a solar energy reflection of 7 to 8 percent for unfilmed glass sheets having the same composition and thickness. These copper films are tenaciously adherent to the glass base, and can not be removed by "Scotch" tape in a test which involves pressing a 4 to 5 inch long by ¾ inch wide "Scotch" pressure sensitive adhesive tape onto the copper filmed surface of the glass article so as to allow 3 to 4 inches of "Scotch" tape to contact the copper film surface with one inch remaining free as a source for thereafter tearing the "Scotch" tape from the surface. Upon removal of the 3 to 4 inch section of "Scotch" tape from the copper filmed surface, no visible delamination of the copper film occurs. The "Scotch" tape test is a conventional test for determining adhesion of a film to a glass surface.

Example II

| Component: | Percent by weight |
|---|---|
| $SiO_2$ | 71.6 |
| $Na_2O$ | 13.1 |
| $CaO$ | 11.7 |
| $MgO$ | 2.5 |
| $Na_2SO_4$ | 0.7 |
| $NaCl$ | 0.1 |
| $Fe_2O_3$ | 0.1 |
| $Al_2O_3$ | 0.2 |

Polished clear glass plates 12 inches by 12 inches by 0.250 inch of the composition listed above are cleaned and rinsed in accordance with Example I. These plates are then filmed with copper in accordance with the procedure of Example I to yield glass plates having a transparent copper film having essentially the same adherence and thermal and luminous transmittance properties as the articles produced in Example I. The average thickness of the transparent metallic copper films is approximately 0.75 x $10^{-6}$ inches.

Example III

| Component: | Percent by weight |
|---|---|
| $SiO_2$ | 68.9 |
| $Na_2O$ | 16.1 |
| $CaO$ | 7.7 |
| $MgO$ | 2.7 |
| $Na_2SO_4$ | 0.6 |
| $NaCl$ | 0.2 |
| $Fe_2O_3$ | 0.1 |
| $Al_2O_3$ | 3.0 |
| $K_2O$ | 0.5 |
| $As_2O_5$ | 0.1 |
| $BaO$ | 0.05 |
| $NiO$ | 0.025 |
| $CoO$ | 0.0039 |

Polished light grey tinted glass plates 12 inches by 12 inches by ⅛ inch of the composition listed above are cleaned and rinsed in accordance with Example I. These cleaned, rinsed plates are then filmed with copper in accordance with the procedure of Example I, with the sole exception being that instead of applying the copper salt film forming solution at room temperature, the solution is heated to a temperature of 100° to 105° F. prior to contact with the previously silvered glass surfaces. Transparent copper films having an average thickness of approximately 1.5 x $10^{-6}$ inches are formed in a period of two minutes using the preheated copper solution.

It is thus realized that by heating the copper solution to temperatures slightly above room temperature, the rate at which the copper film is deposited can be substantially increased. The copper films thus produced are pleasing in appearance and of uniform texture, and possess excellent adhesion to the glass base. The thermal and luminous transmittance properties of these films are essentially the same as reported for the films formed in accordance with the procedure of Example I above.

EXAMPLE IV

| Component | Glass composition (percent by weight) | | |
|---|---|---|---|
| | 1 | 2 | 3 |
| $SiO_2$ | 71.3 | 71.2 | 68.8 |
| $Na_2O$ | 13.3 | 13.7 | 15.3 |
| $CaO$ | 11.7 | 11.8 | 7.0 |
| $MgO$ | 2.5 | 2.3 | 2.7 |
| $Na_2SO_4$ | 0.7 | | 0.5 |
| $Fe_2O_3$ | 0.4 | 0.4 | 0.9 |
| $CoO$ | 0.0038 | 0.008 | 0.0035 |
| $Se$ | 0.008 | 0.005 | |
| $NiO$ | | 0.009 | 0.024 |
| $As_2O_5$ | | | 0.1 |
| $Al_2O_3$ | | | 3.3 |
| $BaO$ | | 0.2 | 0.6 |
| $K_2O$ | | | 1.1 |
| $SO_3$ | | 0.4 | |

12 inches by 12 inches by ⅛ inch flat glass test samples of color tinted heat absorbing glass composition "1," "2" and "3" listed above are cleaned and rinsed as in Example I. Then the cleaned, rinsed samples are contacted with stannous chloride solution, ammoniacal silver solution, and the copper filming solution of Example I, with the sole exception being that a water soluble cobalt salt, cobalt chloride, is employed in place of the nickel salt employed in Example I. No appreciable difference in film uniformity or texture is noted. Good transparent copper films are formed.

In these tests, the cobalt salt acts in the same manner as the nickel salt of Examples I to III in preventing blistering and exfoliation of the transparent copper films.

Companion tests are run on 12 inch by 12 inch by 1/8 inch flat glass test samples of identical composition and treated in identical fashion with the stannous salt solution, the ammoniacal silver nitrate silvering solution, and the copper film forming solution except that neither a nickel or cobalt salt is employed. Great difficulty is experienced in attempting to develop adherent, transparent metallic copper films of uniform texture due to a marked blistering occurring during the copper filming operation. From these tests, it is concluded that when a cobalt or nickel salt is not included in the copper film forming solution, blistering occurs accompanied by exfoliation (delamination) of the copper film thus leading to an unsatisfactory copper filming procedure.

Example V 12 inch by 12 inch by 1/8 inch polished glass plates of the glass compositions of Examples I to III respectively, are cleaned and rinsed according to Example I. Then these glass plates are contacted with stannous chloride solution, ammoniacal silver nitrate solution, and provided with a transparent copper film by contacting with the aqueous copper salt solution as in Example IV, except that the aqueous copper filming solution is preheated to a temperature of 100° F. to 110° F. prior to the contact of the glass to be filmed. During the copper filming procedure, it is noted that the copper is deposited onto the previously silvered glass surface faster than is possible using the room temperature copper filming solution. It was also noted that instead of taking two minutes to develop thin, transparent copper films having an average thickness of $1.0 \times 10^{-6}$ inches, transparent copper films of this thickness can be developed in approximately one-half the time, viz, 60 seconds when using aqueous copper film forming solutions at temperatures in excess of normal ambient room temperatures.

Example VI 12 inches by 12 inches by 1/8 inch clear glass sheets of glass composition set forth in Example I above are cleaned and rinsed according to Example I. Then these sheets are contacted with the aqueous stannous chloride solution, ammoniacal silver nitrate solution, and aqueous copper filming solution containing cobalt chloride in accordance with the copper filming procedure of Example IV. Instead of forming transparent, thin copper films, however, the filming procedure is continued by continuously pouring fresh copper filming solution over a time period of 5 to 10 minutes to develop comparatively thick, opaque copper films having an average thickness of approximately $20 \times 10^{-6}$ inches. The opaque copper filmed glass articles prepared by this Example are essentially copper mirrors. The copper filmed surface of these mirrors can be coated with an opaque paint in accordance with conventional mirroring techniques. The opaque copper film thus deposited displays tenacious adhesion to the presilvered glass base and shows good optical uniformity and texture.

Example VII

The copper mirroring procedure of Example VI is repeated on 12 inches by 12 inches by 1/8 inch clear glass plates of the glass composition set forth above in Example II to produce opaque copper mirrors having the essentially the same optical and adhesion properties of the copper mirrors of Example VI. However, in this test, the desired thick opaque copper films developed by immersing the presilvered surface of the glass articles in the aqueous copper film forming solution for a period of from about 8 to 10 minutes. The resulting copper mirror films possess essentially the same properties as those of Example VI above.

EXAMPLE VIII 12 inches by 12 inches by 1/8 inch plates of the light grey tinted glass composition set forth above in Example III are provided with opaque metallic copper mirror films having an average thickness of $2.5 \times 10^{-6}$ inches in accordance with an essentially two-stage procedure. The first stage of the procedure involves the deposition of a thin transparent copper film using an aqueous copper film forming solution containing nickel sulfate in accordance with the procedure of Example III, viz, preheating the aqueous copper film forming solution to a temperature of slightly above 100° F. prior to contact with the glass article. The second stage of the copper film formation involves galvanic deposition of copper to build up the thickness to the desired where the copper films are opaque to form the copper mirrors. This combined procedure involves copper using conventional galvanic deposition onto the thin, transparent chemically deposited copper films. The properties of these opaque copper mirror films, with regard to adhesion, film uniformity and texture are essentially the same as those opaque copper films of Examples VI to VII.

EXAMPLE IX

Clear polished glass plate 24 inches by 24 inches by 1/8 inch of the composition given in Example II above are cleaned and rinsed in accordance with Example I. Then these are provided with a transparent metallic copper film using the nickel sulfate containing copper filming solution in accordance with the filming procedure of Example I. The transparent copper films thus deposited have an average thickness of approximately $1.0 \times 10^{-6}$ inches. Then the thus filmed plate is placed in a common frame member with another unfilmed plate of the same glass composition and size to form a glass insulating unit as depicted in FIGURE 2 of the drawings. The procedure employed to form these heat reflective glass insulation structures is the same as that used to form glass insulation structures from unfilmed glass sheets and plate, e.g., the procedure of U.S. Patent No. 2,838,810. The glass articles produced in accordance with this example possess utility as insulating glass solar shields since the transparent copper film reflects solar heat energy.

EXAMPLE X

Polished light grey glass plates of the glass composition set forth above in Example III are cleaned and rinsed in accordance with Example I. Then these plates are contacted with aqueous stannous salt, ammoniacal silver nitrate and copper film forming solutions in accordance with the procedure of Example V. The copper film forming solution contains cobalt chloride and is preheated to a temperature of 120° F. prior to contact with the presilvered glass surface.

Then one such transparent coppered filmed glass plate is placed in a common frame with a non-copper filmed light grey glass plate of the composition in Example III, using insulating unit edge sealing procedures as shown in U.S. Patent No. 2,838,810. This article possesses utility as a solar heat shielding glass insulation unit.

EXAMPLE XI

Two clear polished glass plate of the glass composition given in Example II above are provided. One of these plates is provided with a thin transparent copper film ($1.0 \times 10^{-6}$ inches thick) using the room temperature copper filming procedure of Example IV. Then both plates are laminated according to U.S. Patent No. 2,948,645 using polyvinyl butyral as the thermoplastic interlayer material.

The copper filmed sheet is laminated inwardly in contact with the interlayer as shown in FIGURE 6 of the accompanying drawings. These transparent copper filmed laminated articles possess utility as transparent laminated solar shields of the safety-glass type.

EXAMPLE XII

Heat absorbing glass plate 12 inches by 12 inches by 1/8 inch and having the glass compositions "1," "2," and "3" given above in Example IV are provided with a transparent copper film approximately $1.0 \times 10^{-6}$ inches thick by heating a copper filmed forming solution of Example III. Then the thus copper filmed glass plates are laminated with their transparent copper films on the interior part of the sandwich and continuous with the thermoplastic interlayer to glass plates of identical glass composition using the now conventional prepressing and autoclaving glass laminating techniques shown in U.S. Patent No. 2,948,645 to L. A. Keim. These laminated transparent copper filmed glass articles serve as safety-glass type solar shields and can be employed as transparent viewing closures for rooms, buildings, compartments, etc.

The above examples show the use of nickel sulfate and cobalt chloride as the nickel and cobalt salts, respectively for use in the copper filming solutions. However, it should be realized that other water-soluble and readily water-dispersible salts of nickel and cobalt can be employed in accordance with this invention as long as such do not decompose objectionably at treatment temperature. The following nickel and cobalt salts can be listed as exemplary for use in accordance with this invention: sulfates, chlorides, bromides, iodides, nitrates, acetates, ammonium iodides, perchlorates, etc.

Example XIII.—Supersensitization with salts of palladium, platinum, and gold

To determine the effectiveness of salts of metals other than silver as supersensitizing agents for copper deposition, experiments similar to Example I were conducted with palladium, chloride, gold chloride, and platinum chloride being separately substituted for silver chloride.

It was found that complete copper coverage of the glass plates could not be achieved following either the gold chloride or platinum chloride supersensitization. Complete copper coverage was obtained after palladium chloride supersensitization when the coppering solution was freshly prepared from the following two solutions:

| Solution I | Solution II |
|---|---|
| Cupric sulfate | Rochelle salts |
| Nickel chloride | Sodium hydroxide |
| Formaldehyde | Water |
| Water | |

The transparent copper film deposited over the palladium film was non-uniform and unacceptable for use as a viewing closure. Even if the resulting film was satisfactory, the necessity of always using a fresh coppering solution would mitigate against the adoption commercially of a coppering process involving palladium sensitization.

Example XIV.—Hydrazine reducing agents

To determine the effectiveness of hydrazine reducing agents for silver supersensitization, hydrazine sulfate and hydroxylammonium sulfate were separately substituted for dextrose sugar in the silver nitrate solution of Example I. Glass plates sensitized with stannous chloride, as in Example I, were supersensitized with the hydrazine-containing silver nitrate solutions, followed by coppering in the manner of Example I.

The copper films formed after supersensitization in a hydrazine-containing silver nitrate solution were non-uniform and unsatisfactory as a transparent viewing closure.

Opaque copper films formed after supersensitizing with a hydrazine-containing silver nitrate solution showed no defects. However, these films were not so durable as opaque films formed after supersensitization in a dextrose-containing silver nitrate solution.

Example XV.—Coppering in absence of a salt of nickel or cobalt

To determine the effectiveness of coppering solutions containing no nickel or cobalt, a copper solution similar to that shown in Example I was prepared, except that nickel sulfate was omitted.

After stannous chloride sensitization and silver supersensitization in the manner outlined in Example I, several glass plates were copper coated with the above-described copper solution containing no nickel sulfate. Copper films formed rapidly on the plates. However, the films began to cloud almost immediately and, within about two minutes, the films had begun to exfoliate. No clouding or peeling was noticed in copper films formed in a coppering solution containing either a nickel salt or a cobalt salt.

While the invention has been set forth with great particularity in the foregoing examples, it should be understood that the present invention in its broadest aspects is not necessarily limited to the particular materials, temperatures, contact times, and other procedural conditions set forth above in the examples.

I claim:

1. A method of forming transparent copper films on non-porous transparent siliceous substrates which comprises contacting said substrate with a stannous salt solution, thereafter contacting said substrate with an ammoniacal silver salt solution containing a reducing agent selected from the class consisting of formaldehyde, dextrose, and invert sugar to deposit a thin transparent silver film on said glass, and then contacting the thus silvered glass with an alkaline copper salt solution containing a reducing agent in the presence of a salt of metal selected from the group consisting of nickel and cobalt.

2. A method according to claim 1 wherein said silver film ranges from 0.00000004 to 0.0000002 inch in thickness.

3. The method according to claim 1 wherein said copper salt solution contains a reducing agent comprising a tartrate salt and formaldehyde.

4. A method according to claim 1 wherein said stannous salt and silver salt contacts are conducted at a temperature ranging from about 50 to 150° F., and said copper salt contact is conducted at a temperature ranging from about 50 to 150° F. for a time period ranging from about 1 to about 15 minutes.

5. A method according to claim 1 wherein said metal salt is a nickel salt.

6. A method according to claim 1 wherein said metal salt is a cobalt salt.

7. A method according to claim 1 wherein said siliceous substrate is a soda-lime-silica glass.

8. A method of forming a transparent copper film on transparent soda-lime-silica glass which comprises contacting soda-lime-silica glass with an aqueous solution of a stannous salt, thereafter contacting said glass with an aqueous ammoniacal silver salt solution containing about 0.001 percent by weight to about 1.0 percent by weight of a silver salt and a reducing agent selected from the class consisting of formaldehyde, dextrose, and invert sugar to deposit a transparent silver film having a thickness ranging from 0.00000004 to 0.0000002 inch on said glass, and then depositing a transparent copper film of about 1 milligram to about 60 milligrams per square foot of glass surface by contacting the thus silvered glass with an aqueous alkaline copper salt solution containing a tartrate salt and formaldehyde in the presence of a salt of a metal from the group consisting of nickel and cobalt.

9. A method according to claim 8 wherein said stannous salt and silver salt contacts are conducted at temperature ranging from about 65 to about 95° F., and said copper salt contact is conducted at a temperature ranging from about 50 to 150° F. for a time period ranging from about 1 to about 15 minutes.

10. A method according to claim 8 wherein the pH of said aqueous copper salt solution ranges from about 10 to about 12.

11. A method according to claim 8 which includes the step of electrolytically depositing copper onto the thus treated glass subsequent to the contact of the copper salt solution with the silvered glass.

12. A transparent copper filmed soda-lime-silica glass article having reduced transmission of solar heat energy and a luminous transmittance of from about 1 to 50 percent wherein the copper film is deposited in accordance with the method of claim 8.

13. An insulating soda-lime-silica glass unit having reduced transmission of solar heat energy which comprises two soda-lime-silica glass sheets having a layer of air therebetween and mounted in a common frame wherein at least one of said glass sheets has a transparent copper film on a surface thereof, said transparent copper film being deposited in accordance with the method of claim 8.

14. A heat insulating oven door unit containing a transparent glass sheet having a transparent metallic copper film thereon, said transparent copper film being deposited in accordance with the method of claim 1.

15. A laminate comprising a plurality of glass sheets joined by thermoplastic interlayer material wherein at least one of said glass sheets has a transparent copper film thereon in contact with said interlayer material, said transparent copper film being deposited in accordance with the method of claim 1.

16. An article comprising a transparent heat absorbing glass base having a transparent copper film thereon, said transparent copper film being deposited in accordance with the method of claim 1.

References Cited

UNITED STATES PATENTS

| 594,758 | 11/1897 | Rost | 117—35 X |
|---|---|---|---|
| 1,957,279 | 5/1934 | Linke. | |
| 2,444,976 | 7/1948 | Brown. | |
| 2,899,333 | 8/1959 | Gee et al. | 117—35 |
| 3,069,301 | 12/1962 | Buckley et al. | 161—196 |
| 3,093,509 | 6/1963 | Wein | 117—35 X |

FOREIGN PATENTS

| 253,524 | 7/1964 | Australia. |
|---|---|---|
| 490,159 | 8/1938 | Great Britain. |

RALPH S. KENDALL, Primary Examiner

U.S. Cl. X.R.

52—616; 117—33.3, 35, 54, 124, 160; 126—200; 161—45, 199, 408